(12) United States Patent
Wood et al.

(10) Patent No.: US 8,500,989 B2
(45) Date of Patent: Aug. 6, 2013

(54) TURBOELECTRIC COAGULATION APPARATUS

(75) Inventors: Lockett E. Wood, Lyons, CO (US); William R. Lowstuter, Golden, CO (US); John E. Schumacher, Boulder, CO (US); Karen V. Schumacher, legal representative, Boulder, CO (US)

(73) Assignee: Avivid Water Technology, LLC, Windsor, CO (US)

( * ) Notice: Subject to any disclaimer, the term of this patent is extended or adjusted under 35 U.S.C. 154(b) by 882 days.

(21) Appl. No.: 12/497,472

(22) Filed: Jul. 2, 2009

(65) Prior Publication Data
US 2011/0000790 A1  Jan. 6, 2011

(51) Int. Cl.
*C02F 1/463*  (2006.01)
*C02F 1/46*  (2006.01)

(52) U.S. Cl.
USPC ............... 205/755; 205/742; 205/743

(58) Field of Classification Search
USPC .............. 205/742, 743, 750, 751, 755
See application file for complete search history.

(56) References Cited

U.S. PATENT DOCUMENTS

| | | | | |
|---|---|---|---|---|
| 2,585,060 A * | 2/1952 | Wallace | ................. | 204/402 |
| 4,623,436 A * | 11/1986 | Umehara | ................. | 205/743 |
| 5,004,537 A | 4/1991 | Brown | | |
| 6,099,703 A * | 8/2000 | Syversen et al. | ............. | 204/232 |
| 6,139,710 A * | 10/2000 | Powell | ................. | 204/673 |
| 6,448,528 B1 * | 9/2002 | Yoshida | ................. | 219/69.15 |
| 2004/0007539 A1 | 1/2004 | Denes et al. | | |
| 2004/0020861 A1 * | 2/2004 | Lehmann et al. | ............. | 210/748 |
| 2005/0247571 A1 * | 11/2005 | Grigg | ................. | 205/743 |
| 2007/0175767 A1 | 8/2007 | Suzuki | | |
| 2008/0185293 A1 * | 8/2008 | Klose et al. | ............. | 205/687 |
| 2009/0101490 A1 | 4/2009 | Thiers | | |
| 2009/0107915 A1 * | 4/2009 | Skinner et al. | ............. | 210/636 |
| 2011/0297552 A1 * | 12/2011 | Boyle et al. | ............. | 205/742 |

FOREIGN PATENT DOCUMENTS

NL    1014806 C2 * 10/2001

OTHER PUBLICATIONS

NL1014806 (human translation).*
International Search Report for PCT/US10/40827, International Searching Authority, Aug. 23, 2010, pp. 1-12.

* cited by examiner

*Primary Examiner* — Keith Hendricks
*Assistant Examiner* — Salil Jain
(74) *Attorney, Agent, or Firm* — Polsinelli PC

(57) ABSTRACT

An apparatus and method for removing contaminant species from water by electrocoagulation are described. Alternating grounded, rotating, planar circular electrodes and stationary planar electrodes function as a Tesla fluid pump when placed in contact with the contaminated water, causing the water to flow between the rotating and stationary electrodes. An insoluble abrasive material introduced into the water removes scale from the electrodes while the water is pumped thereby. A direct electric current is caused to flow between each pair of rotating and stationary electrodes, thereby producing electrocoagulation of the contaminants in the water flowing therebetween. The electrocoagulated materials may be separated from the treated water by filtration or by permitting the treated water to stand for a chosen period.

33 Claims, 7 Drawing Sheets

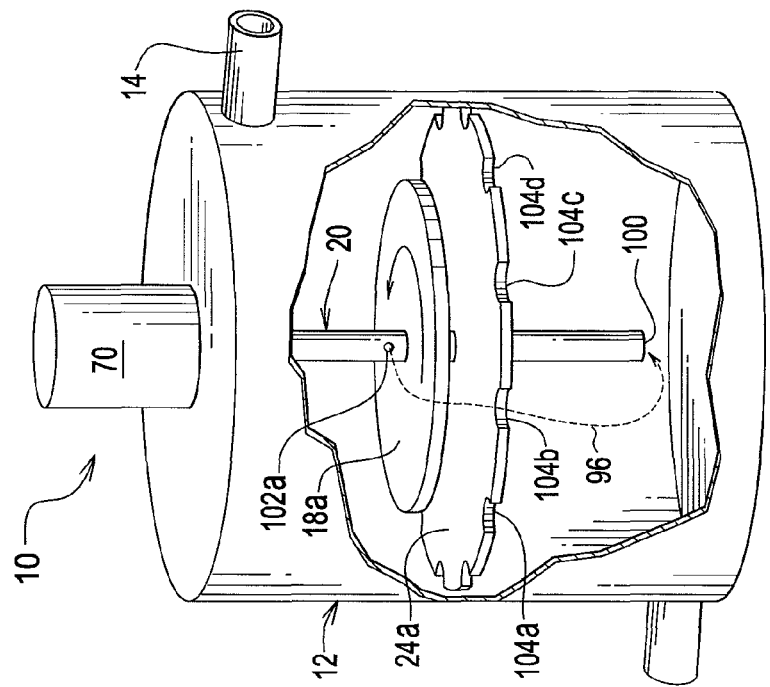
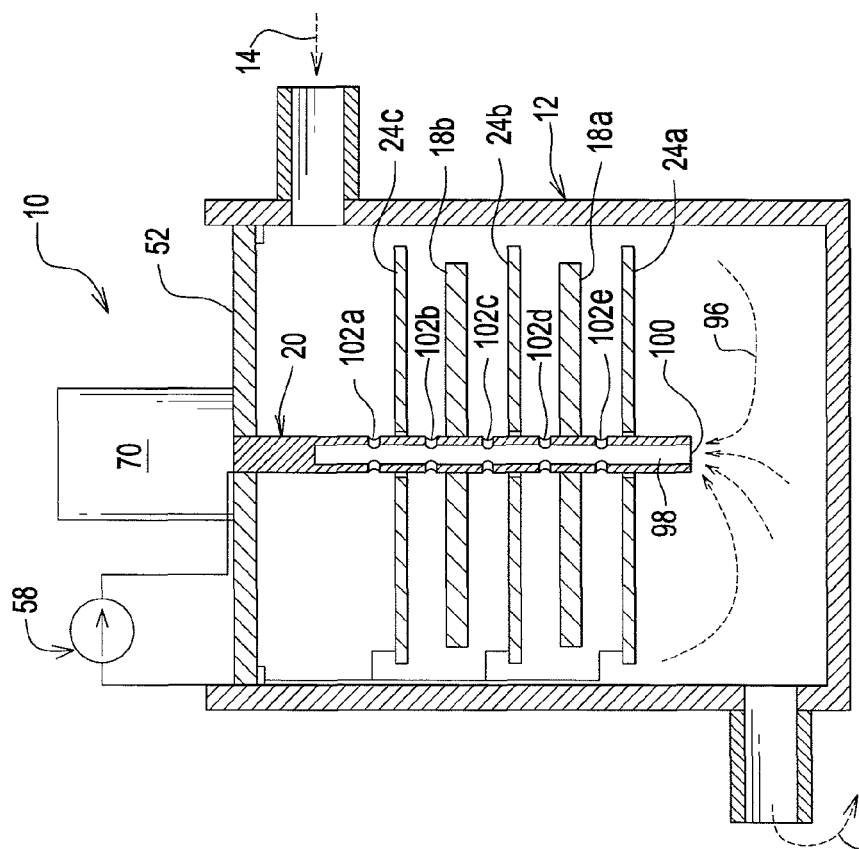

TURBOELECTRIC COAGULATION APPARATUS

FIELD OF THE INVENTION

The present invention relates generally to water purification and, more particularly, to purification of water using electrocoagulation.

BACKGROUND OF THE INVENTION

Rivers, canals, estuaries and other water bodies which are used as sources of clean water in developing countries have become polluted by indiscriminate discharge of industrial and animal waste products and by natural processes such as geochemical processes which have introduced dangerous elements including arsenic into the groundwater. Wastewater generated by increasing population, industry and other sources has become problematic in developed countries as well.

Coagulation is an important reaction for water treatment. Ions from heavy metals, as an example, and colloids generally remain in solution as a result of their electric charge. By adding ions having opposite charges to the colloids, the ions and colloids can be destabilized and coagulation can be achieved by chemical or electrical methods. In the case of chemical coagulation, a coagulant, such as Alum [$Al_2(SO_4)_3 \cdot 18H_2O$] or ferric chloride, as examples, may be employed. However, chemical coagulation tends to generate large volumes of sludge with significant bound water content.

In electrocoagulation, reactive ions may be generated in situ by oxidation of an effective anode material, or reactive metallic hydroxides may be generated within the effluent, and offers an alternative to the addition of metal salts, polymers or polyelectrolytes. Treatment of wastewater by electrocoagulation has been practiced for about 100 years and currently used in many industries. Metals, colloidal solids and suspended particles and oil droplets may be removed from wastewater by agglomeration or coagulation and resultant separation from the aqueous phase. An electrocoagulated floc tends to contain less water, and is more readily filterable.

Basically, an electrocoagulation reactor includes pairs of parallel conductive metal plates, known as sacrificial electrodes which may be of the same or of different materials. When connected to an external source of electrical power, the anode material will electrochemically corrode, while the cathode will be subject to passivation. Metals such as aluminum and iron are commonly used to generate ions in the water which, as stated hereinabove, remove the contaminants by chemical reaction and precipitation, or by causing colloidal materials to coalesce making these species less soluble.

It is known that electrodes in electrocoagulation reactors often experience scaling or other metal coating processes over time which diminish their effectiveness as electrodes, thereby necessitating the use of readily removable and resurfaceable structures.

A Tesla pump includes a plurality of parallel, flat rigid disks having a suitable diameter and keyed to a shaft driven by a motor such that the disks may rotate together as the shaft is rotated. Fluid is caused to enter the pump in the vicinity of the shaft, and liquid adhesion and viscosity directs the fluid toward the periphery as the disks are rotated, thereby imparting energy thereto as the fluid exits the apparatus.

SUMMARY OF THE INVENTION

Accordingly, it is an object of the present invention to provide an electrocoagulation apparatus wherein the electrode surfaces are cleaned of scale and other deposits during use thereof.

Additional non-limiting objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the apparatus for removing contaminants from water, hereof, includes in combination: a container for holding the water; at least one rotatable planar electrode having an axis; a spindle having an axis collinear with the axis of each of the at least one rotatable electrodes, the at least one rotatable electrode being attached to the spindle; at least one planar stationary electrode having an opening therein effective for permitting the spindle to pass therethrough disposed in the proximity of and parallel to the plane of the at least one rotatable electrode, and forming a volume therebetween, the at least one rotatable electrode and the at least one stationary electrode being disposed in the water; a source of current in electrical contact with the at least one stationary electrode and the at least one rotatable electrode effective for causing electrocoagulation of the contaminants in the water; and means for rotating the spindle about the axis thereof at a chosen angular velocity such that the contaminated water is caused to pass through the volume.

In another aspect of the invention, and in accordance with its objects and purposes, the method for removing contaminants from water, hereof, includes the steps of: providing at least one planar rotatable electrode capable of being rotated about an axis of rotation by a spindle collinear with this axis, and at least one planar stationary electrode disposed in the proximity of and parallel to the plane of the at least one rotatable electrode and forming a volume therebetween, the spindle passing through a first opening in the at least one stationary electrode; contacting the at least one rotatable electrode and the at least one stationary electrode with the contaminated water; rotating the spindle at a chosen angular velocity such that the contaminated water is caused to pass through the volume; and applying a current between the at least one stationary electrode and the at least one rotating circular electrode effective for causing electrocoagulation of the contaminants in the water.

Benefits and advantages of the present invention include, but are not limited to, providing an electrocoagulation reactor in which the electrodes are cleaned as the apparatus removes unwanted contaminants from the water. Another benefit of the present rotating plate apparatus is that a smaller volume apparatus is effective for treating the same volume of water as a larger stationary plate apparatus, due to multiple exposures of the water to the rotating electrodes.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 3A is a schematic representation of a side view of a vertical, hollow shaft embodiment for rotating the circular electrodes illustrating the transportation of water through the shaft as part of the pumping action of the apparatus, while FIG. 3B is a schematic representation of a perspective view of the apparatus shown in FIG. 3A hereof further illustrating peripheral slots in the stationary electrode for permitting water to flow through the electrode.

DETAILED DESCRIPTION OF THE INVENTION

Briefly, the present invention includes an apparatus and method for removing contaminant species from water by electrocoagulation. The water is recirculated by at least one flat rigid disk having a suitable diameter and keyed to a motor driven shaft such that the disk may rotate as the shaft is rotated, and at least one flat, rigid stationary plate spaced apart and parallel to the disk, which together function as a fluid pump. Fluid is caused to enter through at least one opening in the stationary plate in the vicinity of the shaft, and liquid adhesion and viscosity directs the fluid toward the periphery of the disk/plate assembly as the disk is rotated, thereby imparting energy thereto as the fluid departs the outer periphery of the rotating disk. The fluid then recirculates back to the opening near the shaft where it again enters the volume between the stationary plate and the rotating disk such that it can be again accelerated by the rotating disk back to the periphery. Additional flat rigid disks keyed to the motor driven shaft such that they rotate together as the shaft is rotated, and additional stationary plates disposed in an alternating, plate/disk/plate arrangement, as an example, may be added. The apparatus may be located in a reaction tank or reactor, and the flow rate of the water into and out of the reactor and the speed of the rotation of the disks determine the number of repetitions of the water through the pump.

An electric current is caused to flow between each pair of rotating and stationary electrodes, thereby producing electrocoagulation of the contaminants in the water flowing therebetween. The pumping action continuously re-exposes the water to the electrocoagulation process which enables a smaller reactor to be employed for a given volume of water to be processed. An insoluble abrasive material introduced into the water removes scale from the electrodes as the water is pumped thereby.

The electrocoagulated materials may be separated from the treated water by filtration or by permitting the treated water to stand for a chosen period.

Figure 1A:
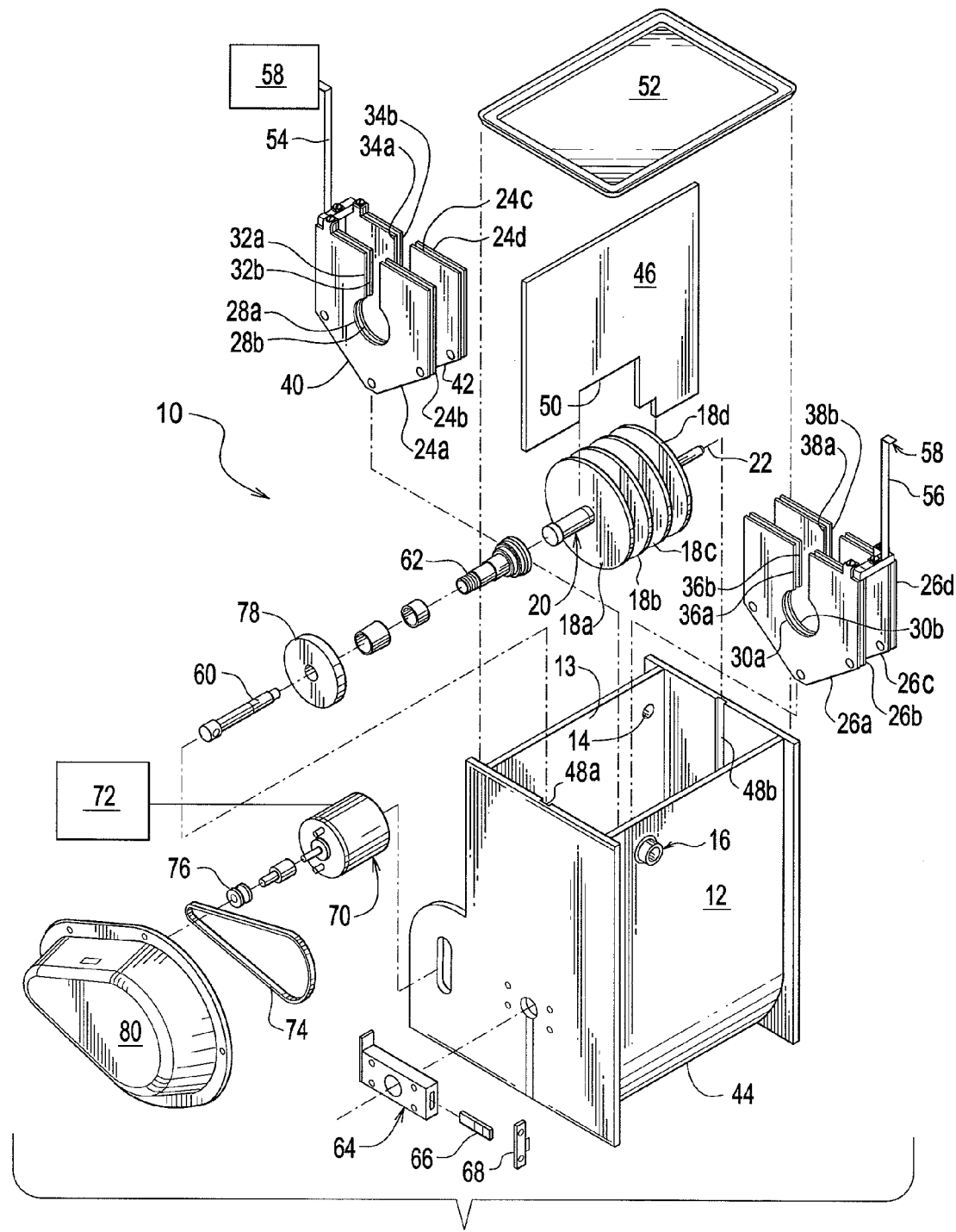
FIG. 1A is a schematic representation of an exploded view of an embodiment of the present electrocoagulation apparatus.

Reference will now be made in detail to the present embodiments of the invention, examples of which are illustrated in the accompanying drawings. In the FIGURES, similar structure will be identified using identical reference characters. Turning now to FIG. 1A, a schematic representation of an exploded view of an embodiment of the present electrocoagulation apparatus, 10, is shown. Container, 12, having internal volume, 13, has inlet, 14, and outlet, 16, ports for introducing contaminated water to and permitting treated water to exit from container 12, respectively. Planar, spaced apart, circular, electrically conducting electrodes, 18a-18d, disposed parallel to each other, and connected by electrically conducting shaft or spindle, 20, capable of rotation about longitudinal axis, 22, and stationary planar, spaced-apart, electrically conducting electrodes, 24a,b, 24c,d, 26a,b, and 26c,d, disposed parallel to each other, are shown as disposed in pairs of electrodes adapted for receiving circular electrodes 18a-18d, respectively, therebetween. It should be mentioned that although electrodes 18 are shown as being circular in the FIGURES, other shapes having an axis of rotation may be contemplated. Electrodes 18 may be constructed using reactive metals such as aluminum, iron, calcium, and magnesium, as examples, while electrodes 24 and 26 may be constructed from an inert conducting material such as stainless steel, titanium, platinum, and graphite, as examples. Alternatively, the stationary electrodes may be constructed using reactive metals, while the rotating electrodes may be fabricated using inert conducting materials. As may be observed in EXAMPLE 2, hereof, electrodes fabricated from different reactive metals may be employed on the same shaft. Openings, 28, and 30, shown in stationary electrodes 24a and 24b and 26a and 26b, respectively, as examples, permit spindle 20 to pass therethrough without coming in contact therewith. Clearly, electrode pairs 24c, 24d, 26c, and 26d, have similar openings (not shown in FIG. 1A) in order to permit spindle 20 to pass therethrough. Additional openings, 32a,b and 36a,b, in plates 24a,b and 26a,b, respectively, and 34a,b and 38a,b in plates 24c,d and 26c,d, respectively are contiguous with openings 28a,b, 30a,b, respectively, and those openings not shown in FIG. 1A, and permit water to flow more freely into the volumes formed between circular electrodes 18a-18d and stationary electrodes 24a-26d. Stationary electrodes 24 and 26 may have curved or angled bases, 40 and 42, as examples, to better fit the inside shape (not shown in FIG. 1A) of the bottom portion, 44, of container 12. This feature, along with the use of baffle, 46, adapted to fit into grooves, 48a and 48b, in container 12, and having indentation, 50, to enable the baffle to more closely fit around stationary electrodes 24 and 26, reduce the quantity of water traveling between fluid input 14 and output 16 of container 12 without passing through the volumes formed between the circular and stationary electrodes, in this specific example. Cover, 52, prevents materials from exiting container 12 as a result of frothing, as an example.

Electrically conducting connectors, 54, and 56, permit a voltage from direct current source, 58, to be applied to stationary electrodes 24 and 26, respectively. Electrically conducting drive shaft components, 60, and, 62, which when connected to spindle 20, enable the rotation of circular electrodes 18. The assembled drive shaft components, in cooperation with brush housing, 64, brush, 66, or other electrically conducting slip ring mechanism and end cap, 68, permit current flow between the electrodes through the water in volume 13. Current source 58 may be a constant current source or other current waveform effective for promoting coagulation. End cap 68 may be grounded, or otherwise provide a current return to source 58.

Electric motor, 70, powered by electric power source, 72, drives belt, 74, using first pulley, 76, attached thereto, the combination driving second pulley, 78, attached to drive shaft component 60 which turns electrodes 18 through spindle 20. Accompanying bushings and shaft seals provide smooth rotation of the drive shaft and prevention of water leakage from container 12. Power source 72 may include batteries, solar cells, and appropriate line voltage. Cover, 80, provides protection for users from belt 74. It is anticipated that other driving apparatus may be utilized to turn shaft component 60 such as a stepping motor for directly turning shaft 60, as an example.

Figure 1B:
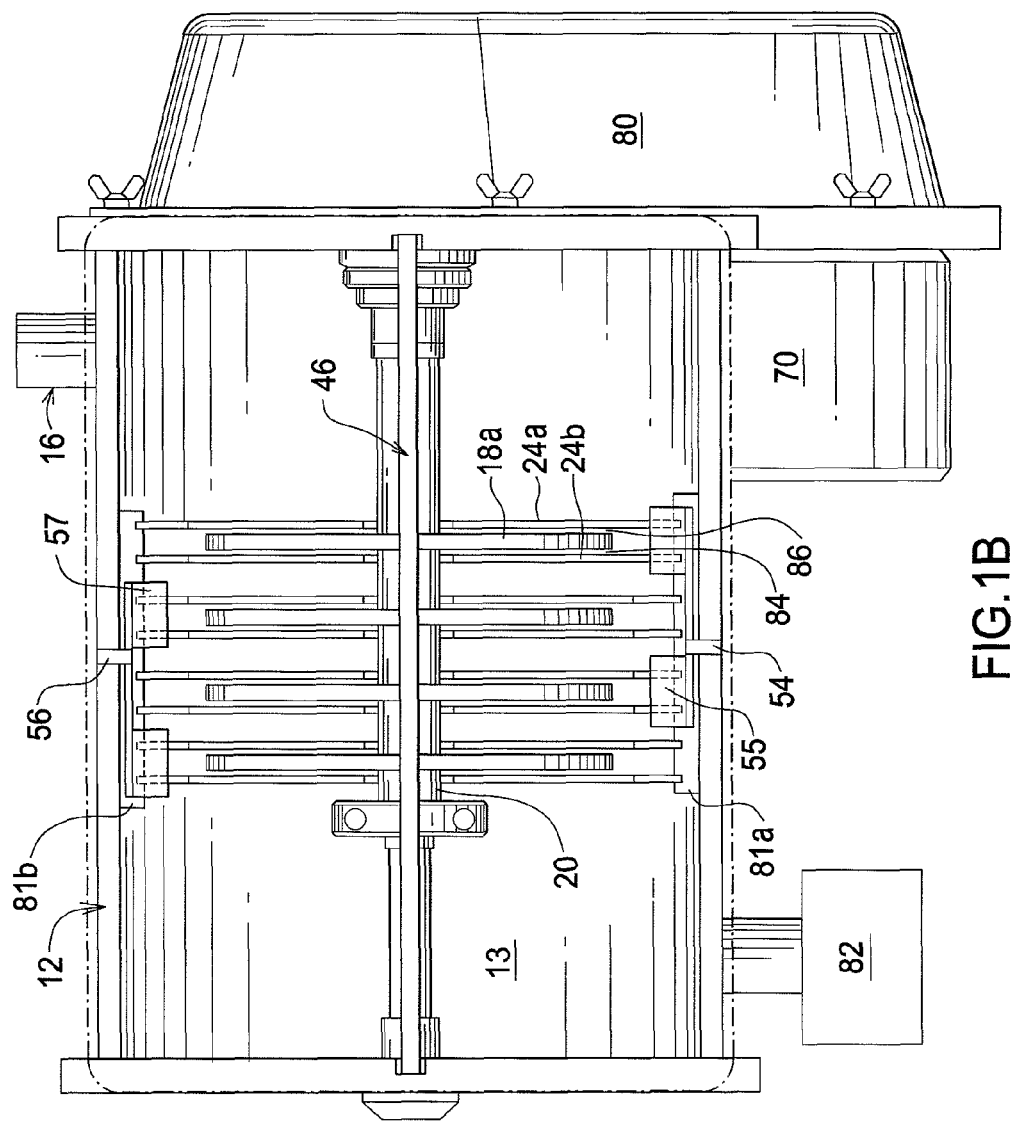
FIG. 1B shows a schematic representation of a top view thereof.

FIG. 1B shows a top view of the embodiment of the electrocoagulation apparatus illustrated in FIG. 1A hereof. Additionally shown are water pump, 82, for flowing water through volume 13 at a chosen rate, thereby generating a selected dwell time for the water in the electrocoagulation environment, and volumes, 84, and 86, between rotating circular electrode 18a and stationary electrodes 24a and 24b, respectively, as examples, through which the rotating electrodes force the water to be treated.

Figure 1C:
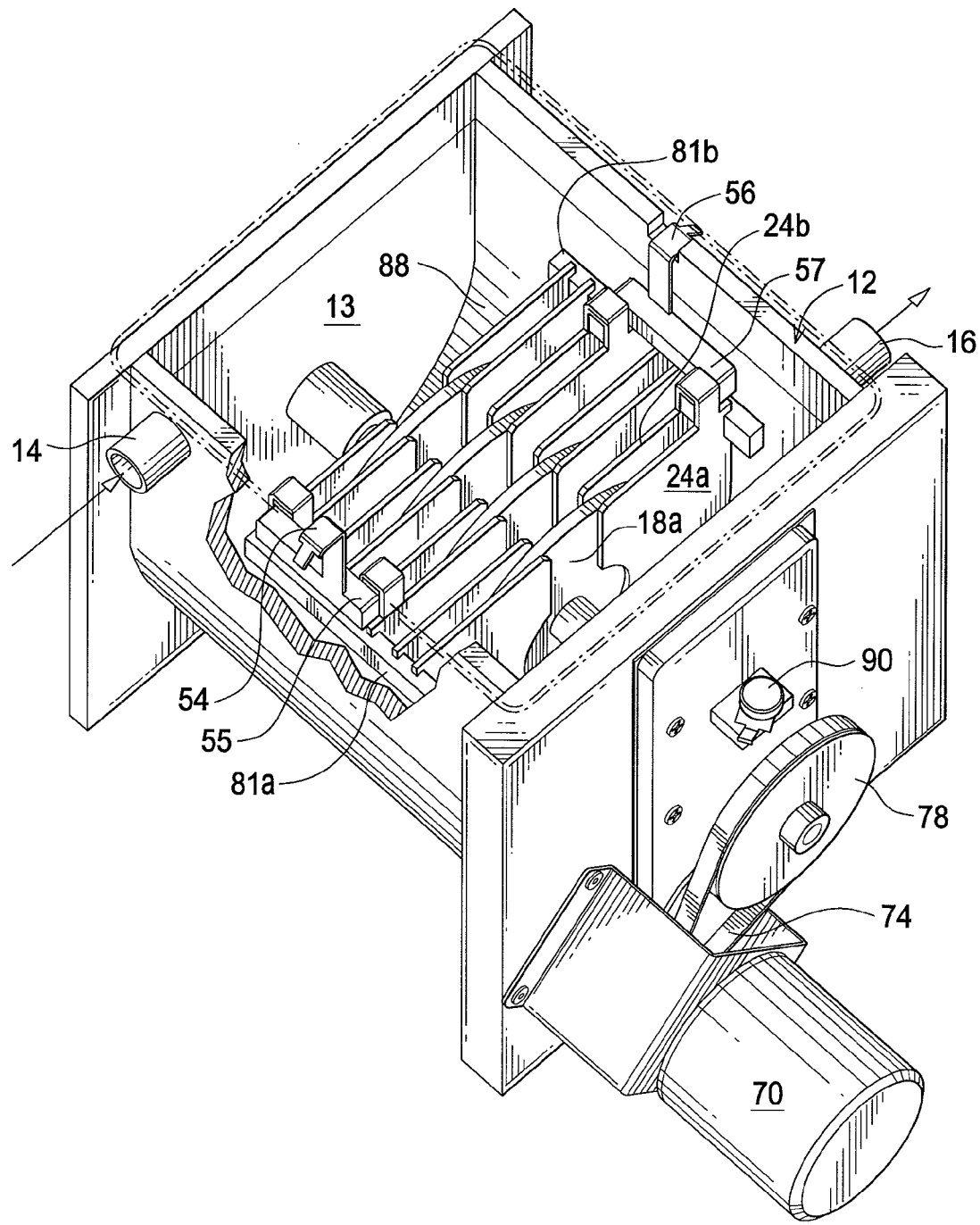
FIG. 1C illustrates a schematic representation of a perspective view of the assembled apparatus.

FIG. 1C illustrates a perspective view of the assembled apparatus illustrated in FIG. 1A hereof, showing a slightly different configuration for motor 70, a curved lower interior portion, 88, for container 12, and an electrical connection, 90, for cover plate 68.

In use, electrocoagulation apparatus 10, is filled with water to be treated such that the electrodes are in contact therewith. Generally, the electrodes are submerged in the water, although complete immersion is not required. An amount of insoluble abrasive material effective for keeping the electrodes free of scale and other coatings may be introduced into container 12 if the raw water sample to be treated contains inadequate abrasive material suspended therein. The abrasive material may be chosen from sand, glass beads, ground glass, or garnet, and mixtures thereof, although any abrasive material may be effective. The rotation speed of the spindle is chosen such that the abrasive material is effectively circulated for depassivation of the electrodes, and such that the apparatus circulates a chosen quantity of water. Rotation speeds between 100 and 1000 RPM are expected to be effective. Typical flow rates for the water through the apparatus with the above-described components are between about 1 gal./min. and about 5 gal./min., depending on the level of contamination of the liquid. Amounts and particle sizes of the abrasive materials are chosen such that the flow rate of the pumped water maintains an effective quantity of particles in suspension and circulating between the plates. Abrasive materials may be removed from the output stream by allowing these materials to settle, as an example, or by using a filtration process. Collected materials may subsequently be returned to container 12 for reuse as is illustrated in reference character, 117, in FIG. 4 hereof.

It has been found that the efficiency of electrocoagulation is related to the conductivity of the water. For a constant current density, the applied voltage may change from 6 V to as high as 70 V during the electrocoagulation process. Adding small amounts of table salt have been observed to increase the speed of the electrocoagulation process and decrease the power requirements. It has also been found that the consumption of the electrodes by ionization of the metal is a direct function of the current density. Since the conductivity of the water cannot readily be controlled, and may change over time, a constant current generator has been employed which changes the voltage across the electrodes to maintain the current at a constant value.

Electrodes having between about 2 in. and about 120 in. diameter, between about 1/32 in. and about 1 in. thickness and spaced-apart between about 1/8 in. and about 0.5 in. are expected to be effective for the electrocoagulation process of the present invention. The dimensions of the apparatus, the number of plates and the required current are determined by the volume of water to be treated per minute. Embodiments of the apparatus of the present invention are anticipated to be effective for processing water volumes between a few quarts per minute and thousands of gallons per minute.

Figure 2A:
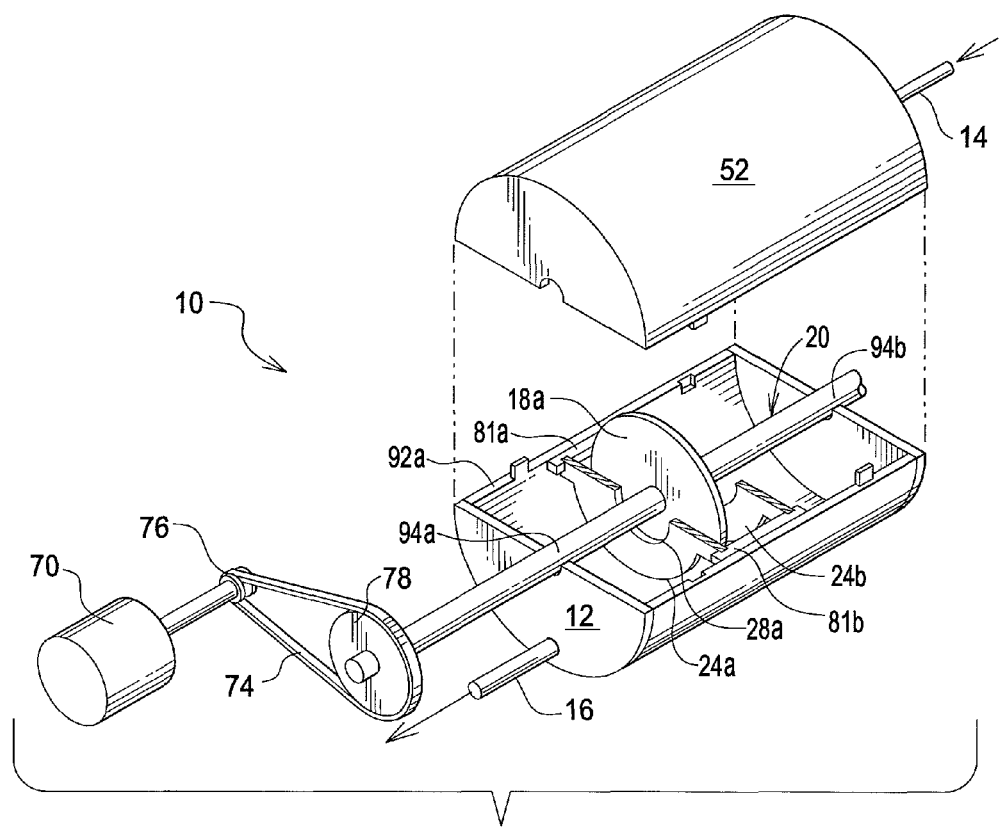
FIG. 2A is a schematic representation of perspective view of another embodiment of the electrocoagulation apparatus illustrating water entering and exiting the apparatus perpendicular to the electrode structure thereof.
Figure 2B:
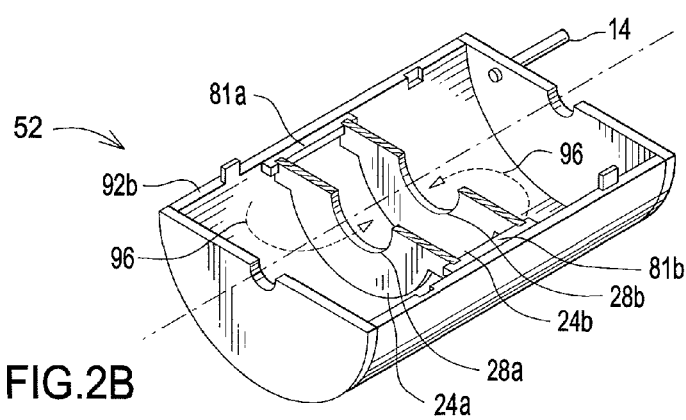
FIG. 2B is a schematic representation of the interior of the top lid showing the stationary electrodes and illustrating the expected flow of water through and around the electrodes as a result of the pumping action of the apparatus when the rotatable electrodes are placed in motion.
Figure 2C:
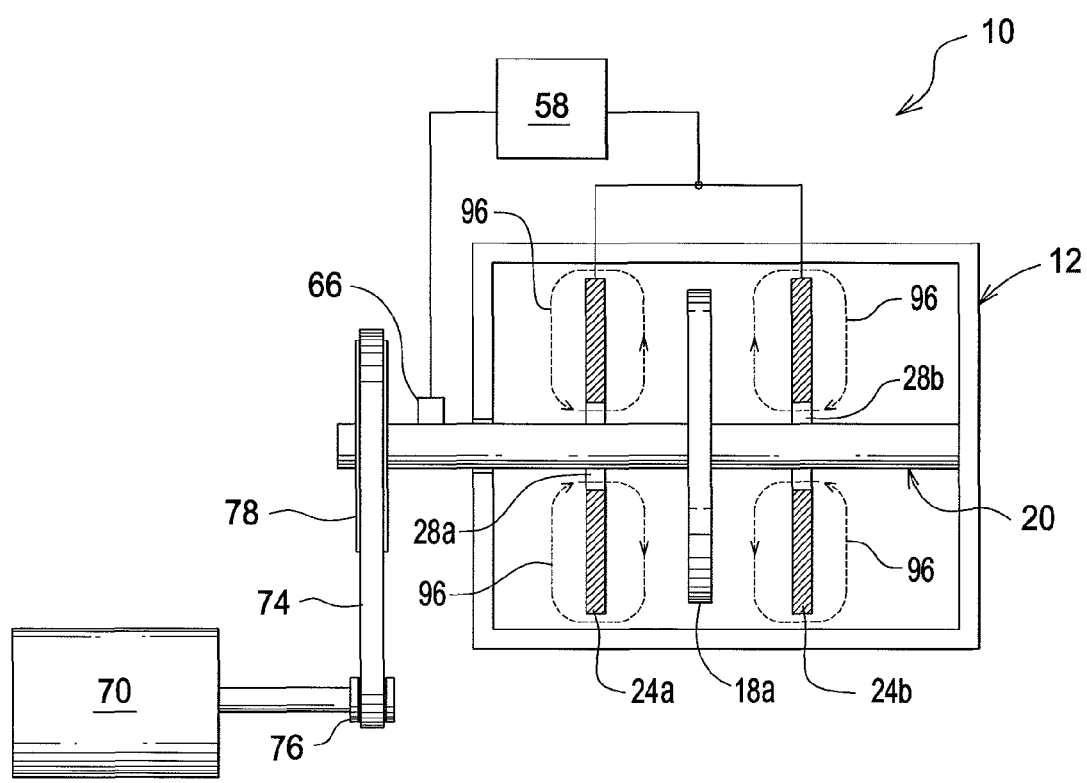
FIG. 2C is a schematic representation of a top view of the embodiment of the electrocoagulation apparatus shown in FIG. 2A hereof, again illustrating the expected water flow through and around the electrodes as a result of the pumping action of the apparatus.

FIG. 2A is a schematic representation of perspective view of another embodiment of the electrocoagulation apparatus illustrating water entering and exiting the apparatus through tubes 14 and 16, respectively, perpendicular to the electrode structure thereof shown as two stationary electrodes 24a and 24b, and rotating electrode 18a. Electrodes 24a and 24b are each illustrated as having two parts which are joined when lid 52 is in place, but may be fabricated as a single electrode. Water sealing gaskets for surfaces, 92a, and, 92b, and shaft seals, 94a, and 94b, for providing a water seal between rotating shaft 20 and container 12 and top portion 52, have not been shown, nor have the electrical connections to the electrodes, in order to simplify FIG. 2A. Apertures 28a and 28b in stationary electrodes 24a and 24b are sized to permit water to readily flow into the region between the stationary electrodes and the rotating electrode 18a as well as between the electrodes and the inner surfaces of container 12 and cover 52 as a result of the pumping action when shaft 20 rotates electrode 18a, while FIG. 2B is a schematic representation of the interior of lid 52 showing the stationary electrodes and illustrating the expected direction of the flow of water, 96, through and around the electrodes as a result of the pumping action of the electrodes. FIG. 2C is a schematic representation of a top view of the embodiment of the electrocoagulation apparatus shown in FIG. 2A hereof, again illustrating the expected water flow through and around the electrodes as a result of the pumping action of the rotating electrodes.

FIG. 3A is a schematic representation of a side view of electrocoagulation apparatus 10, wherein shaft 20 is oriented vertically and has hollow portion, 98, and open end, 100, for permitting water 96 to enter the shaft, and exit holes, 102a-102e, for permitting the water to exit the shaft, when electrodes 18a-18b are placed in rotary motion. FIG. 3B is a schematic representation of a perspective view of the apparatus shown in FIG. 3A hereof further illustrating peripheral slots, 104, in stationary electrode 24a for permitting water 96 to flow through the electrode, and a vertical orientation of the axis of rotation.

Figure 4:
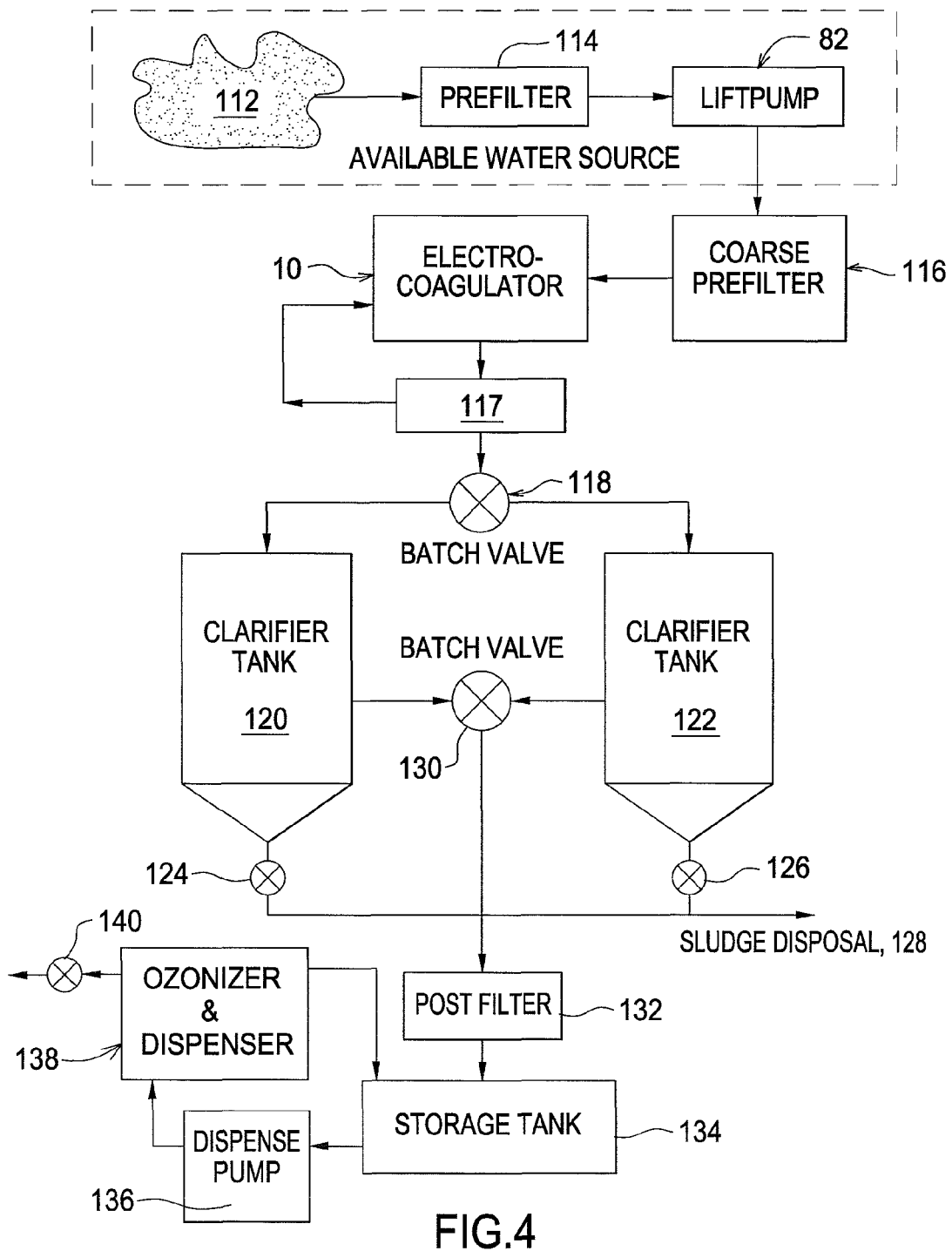
FIG. 4 is a schematic representation of the present electrocoagulation apparatus adapted for processing water from an available source such as a lake, well, mine, or ship bilge, as examples.

FIG. 4 is a schematic representation of the present electrocoagulation apparatus adapted for processing water from an available source, 112, such as a lake, well, mine, or ship bilge, as examples. The water from the source may be prefiltered using filter, 114, and introduced into electrocoagulator 10 using pump 82 for controlling the water flow rate and, hence the dwell time in the electrocoagulator. The water may be further filtered using coarse prefilter, 116. Abrasive exiting electrocoagulator 10 along with the treated water may be removed by separator, 117, and returned to coagulator 10. Treated water exiting coagulator 10 may be directed through batch valve, 118, to one or more clarifier tanks, 120, 122, where the electrocoagulated contaminants are separated by gravity from the water and directed through valves, 124, and 126, respectively, to sludge disposal location, 128. Purified water may be directed out of tanks 120 and 122 using valve 130, and may be further filtered using post filter, 132, and stored in tank, 134. Pump, 136, may be used to direct the water from tank 134 through ozonizer, 138, if additional purification is required, and dispensed using valve, 140. Whereas, FIG. 4 illustrates the separation of the electrocoagulated contaminants by batch processing, it is equally effective to use a continuous settling process or a continuous filtration process.

Having generally described the invention, the following EXAMPLES provide additional details:

EXAMPLE 1

A mixture of 200 ml of coal dust and 3.7 L of water was added to a 1 gal. container having a similar configuration to that illustrated in FIGS. 3A and 3B, hereof, except that one aluminum rotating electrode and two aluminum stationary electrodes were employed. A voltage of 12 V was applied for 5 min. between the stationary and rotating electrodes, the rotating electrodes having 3" diameter, 1/16 in. thickness, spaced apart from the stationary electrodes by 1/4 in., and rotated at 600 rpm. The stationary electrodes were 1/16 in. thick. A current of about 5 A flowed between the electrodes. No abrasive or salt was added to the water. After coagulation, the processed water was allowed to stand for 5 min. and the turbidity was observed to change from high to low using a commercially available turbidity meter.

EXAMPLE 2

A surrogate water sample having greater than 200 ppb of arsenic as $As^{3+}$, was flowed into a 1.25 gal. electrocoagulation cell similar to that illustrated in FIGS. 3A and 3B, hereof, at about 20 L/h having both iron and aluminum 3 in. diameter electrodes spaced 0.250 in. apart, on the same spindle rotated at about 900 rpm, and separated by an aluminum stationary electrode equally distant therebetween. Playground sand was used as the abrasive, the voltage between the rotating and stationary electrodes was 12 V and the current flow therebetween was about 5 A. After treatment, the water exiting the container was allowed to settle for 30 min., and then decanted without additional filtering. The arsenic concentration was found to be below the detectable limit of the testing apparatus employed, which was estimated to be less than 10 ppb. Analysis of the floc indicated an arsenic concentration of greater than 300 ppb. It is believed by the present inventors that the iron as $Fe^{+++}$ reacted with the arsenic and that the aluminum was effective in removing both the iron and the reacted arsenic.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for removing contaminants from water, comprising in combination:
   a container for holding the water;
   at least one planar electrode capable of being rotated about an axis, wherein said at least one rotatable planar electrode is substantially vertical;
   a spindle having an axis collinear with the axis of each of said at least one rotatable planar electrode, said at least one rotatable planar electrode being attached to said spindle;
   a first planar stationary electrode having a first opening therein effective for permitting said spindle to pass therethrough disposed in the proximity of and parallel to the plane of said at least one rotatable planar electrode, and forming a first volume therebetween, said at least one rotatable planar electrode and said first planar stationary electrode being disposed in said water;
   a second planar stationary electrode having a second opening therein effective for permitting said spindle to pass therethrough disposed in the proximity of and parallel to the plane of said at least one rotatable planar electrode, and forming a second volume therebetween, said at least one rotatable planar electrode and said second planar stationary electrode being disposed in said water;
   said first and second planar stationary electrodes being substantially vertical, said at least one rotatable planar electrode positioned between said first and second planar stationary electrodes;
   a source of electrical current in electrical contact with said first and second planar stationary electrodes and said at least one rotatable planar electrode effective for causing electrocoagulation of the contaminants in said water; and
   a motor coupled with said spindle to rotate said spindle about the axis thereof at a chosen angular velocity such that said contaminated water is caused to pass through said first and second volumes and to flow outward from the axis along said first and second planar stationary electrodes and cause water to flow inward through said first opening and said second opening toward said rotatable planar electrode;
   wherein said first stationary electrode has at least one third opening, said second stationary electrode has at least one fourth opening, said third opening and said fourth opening for permitting water to pass therethrough; and
   wherein said at least one third opening is contiguous with said first opening, said at least one fourth opening is contiguous with said second opening, said third opening and said fourth opening orientated generally upward to receive the spindle for ease of assembly and replacement.

2. The apparatus of claim 1, wherein said at least one rotatable planar electrode comprises a circular electrode having an axis of rotation.

3. The apparatus of claim 1, further comprising means for separating the electrocoagulated contaminants from the treated water.

4. The apparatus of claim 3, wherein said means for separating the electrocoagulated contaminants comprises at least one clarifier tank for permitting the electrocoagulated contaminants in said water to settle.

5. The apparatus of claim 1, wherein said at least one rotatable planar electrode and said first and second planar stationary electrodes are submerged in said water.

6. The apparatus of claim 1, wherein said container comprises a water inlet;
   a water outlet;
   means for introducing said contaminated water into said water inlet such that said contaminated water forms a surface above said water inlet and said water outlet of said container.

7. The apparatus of claim 1, wherein said contaminated water has a chosen dwell time in said container.

8. The apparatus of claim 1, further comprising a planar electrically nonconducting baffle disposed in said container, wherein a plane including said baffle also includes said axis.

9. The apparatus of claim 1, wherein water insoluble abrasive particles having a chosen size are added to said container to reduce deposits on said at least one rotatable planar electrode, and said first and second planar stationary electrodes.

10. The apparatus of claim 9, wherein the insoluble abrasive material is chosen from sand, glass beads, ground glass, and garnet, and mixtures thereof.

11. The apparatus of claim 1, wherein said source of direct current comprises a constant current source.

12. The apparatus of claim 1, wherein salt is added to said contaminated water in order to reduce the voltage required by said source of direct current to generate the direct current.

13. The apparatus of claim 1, wherein said at least one rotatable planar electrode comprises a chemically reactive metal.

14. The apparatus of claim 13, wherein said chemically reactive metal is chosen from aluminum, iron, calcium and magnesium.

15. The apparatus of claim 1, wherein said first and second planar stationary electrodes comprise a chemically inert conducting material.

16. The apparatus of claim 14, wherein said chemically inert conducting material is chosen from stainless steel, titanium, platinum, and graphite.

17. The apparatus of claim 1, wherein said at least one rotatable planar electrode comprises a chemically inert conducting material.

18. The apparatus of claim 17, wherein said chemically inert conducting material is chosen from stainless steel, titanium, platinum, and graphite.

19. The apparatus of claim 1, wherein said first and second planar stationary electrodes comprise a chemically reactive metal.

20. The apparatus of claim 19, wherein said chemically reactive metal is chosen from aluminum, iron, calcium and magnesium.

21. The apparatus of claim 1, further comprising a filter for prefiltering said water containing contaminants before introduction thereof into said container.

22. The apparatus of claim 1, wherein said means for rotating said spindle about the axis comprises an electric motor.

23. The apparatus of claim 22, wherein said electric motor is powered by a source of electricity chosen from batteries, line voltage and solar cells.

24. The apparatus of claim 1, wherein said at least one rotatable planar electrode comprises a first rotatable planar electrode capable of being rotated about said axis;
said spindle having a first axis collinear with said axis of said first rotatable planar electrode, said first rotatable planar electrode being attached to said spindle;
said first rotatable planar electrode positioned between said first and second planar stationary electrodes.

25. The apparatus of claim 24, wherein said at least one rotatable planar electrode comprises a second rotatable planar electrode capable of being rotated about said axis;
said spindle having a second axis collinear with said axis of said second rotatable planar electrode, said second rotatable planar electrode being attached to said spindle;
said second rotatable planar electrode being positioned between a third and a fourth planar stationary electrode;
said third planar stationary electrode having a fifth opening therein effective for permitting said spindle to pass therethrough disposed in the proximity of and parallel to the plane of said second rotatable planar electrode, and forming a third volume therebetween, said second rotatable planar electrode and said third planar stationary electrode;
said fourth planar stationary electrode having a sixth opening therein effective for permitting said spindle to pass therethrough disposed in the proximity of and parallel to the plane of said second rotatable planar electrode, and forming a fourth volume therebetween, said second rotatable planar electrode and said fourth planar stationary electrode.

26. The apparatus of claim 25, wherein a fourth volume is formed between said second and third planar stationary electrodes such that said water circulates unimpeded in said fourth volume before recirculation into said second and third volumes, thereby enhancing electrocoagulation and scale removal.

27. The apparatus of claim 1, wherein said at least one rotatable planar electrode has a diameter of between about 2 inches and about 120 inches.

28. The apparatus of claim 1, wherein said at least one rotatable planar electrode has a thickness of between about $\frac{1}{32}$ inch and about 1 inch.

29. The apparatus of claim 24, wherein said first rotatable planar electrode is spaced-apart from said first stationary electrode between about $\frac{1}{8}$ inch and about 0.5 inch, and said first rotatable planar electrode is spaced-apart from said second stationary electrode between about $\frac{1}{8}$ inch and about 0.5 inch.

30. The apparatus of claim 1, wherein said at least one rotatable planar is an anode, and said first and second planar stationary electrodes are cathodes.

31. The apparatus of claim 8, wherein said baffle is positioned above said axis and is positioned between said water inlet of said container and said water outlet of said container such that a flow of said water between said water inlet and said water outlet is impeded, thereby enhancing the electrocoagulation of contaminants in the water through circulation of said water in said first volume and said second volume.

32. The apparatus of claim 31, wherein said baffle is slidably and removably positioned in a pair of channels defined in said container such that removal of said baffle facilitates ease of removal of said spindle, said at least one rotatable planar electrode, and said first and second planar electrodes.

33. The apparatus of claim 31, wherein said container defines a curved base conforming to a substantially matching curved base of said first and second planar stationary electrodes and said at least one rotatable planar electrode, and said at least one rotatable planar electrode defines a circle with a radius substantially matching said curved base of said container.

* * * * *